United States Patent
Baker et al.

(10) Patent No.: US 6,971,471 B2
(45) Date of Patent: Dec. 6, 2005

(54) MULTI-DIRECTIONAL DRIVE

(75) Inventors: Lawrence Baker, Harper Woods, MI (US); Christopher E. Borroni-Bird, Oakland Township, MI (US); Adrian B. Chernoff, Royal Oak, MI (US); Mohsen D. Shabana, Ann Arbor, MI (US); Robert Vitale, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 156 days.

(21) Appl. No.: 10/305,374

(22) Filed: Nov. 26, 2002

(65) Prior Publication Data

US 2003/0127272 A1      Jul. 10, 2003

Related U.S. Application Data

(60) Provisional application No. 60/337,994, filed on Dec. 7, 2001.

(51) Int. Cl.[7] .................... B62D 33/063; B60K 26/00
(52) U.S. Cl. ................... 180/329; 180/330; 180/326; 180/89.13; 296/190.04
(58) Field of Search .................. 180/326, 329, 180/330, 331, 333, 89.13; 296/190.04, 190.05

(56) References Cited

U.S. PATENT DOCUMENTS

| | | | |
|---|---|---|---|
| 2,303,286 A | | 11/1942 | Lake |
| 3,039,553 A | * | 6/1962 | Van Der Lely et al. .... 180/329 |
| 3,088,537 A | * | 5/1963 | LeTourneau ................ 180/328 |
| 3,195,913 A | * | 7/1965 | Hallsworth ................. 280/775 |
| 3,357,513 A | * | 12/1967 | Sundberg ................... 180/329 |
| 3,722,948 A | | 3/1973 | Walsh et al. |
| 4,059,171 A | * | 11/1977 | Pakosh ...................... 180/328 |
| 4,066,143 A | * | 1/1978 | Umeda et al. ............. 180/329 |
| 4,165,794 A | | 8/1979 | Warner et al. |

(Continued)

FOREIGN PATENT DOCUMENTS

DE       3317340       11/1984       ................. 427/309

(Continued)

OTHER PUBLICATIONS

Stuart Birch, "Stick or Non-Stick," Automotive Engineering International On Line, Mar. 2000.

(Continued)

Primary Examiner—Paul N. Dickson
Assistant Examiner—George D Spisich
(74) Attorney, Agent, or Firm—Kathryn A. Marra

(57) ABSTRACT

A vehicle is capable of being driven in a plurality of forward directions, the direction of travel being a function of the forward-facing orientation of a movable seat or movement of the driver to a different seat. The vehicle includes a frame, at least three wheels, a steering system, a braking system and an energy conversion system operable with respect to at least one of the wheels and controllable through non-mechanical control means. The vehicle has at least one movable seat connected to the frame and at least one operator interface operably connected to at least one of the steering system, braking system and energy conversion system that is usable to drive the vehicle in different directions when the seat is moved. A control cockpit for use on a vehicle controllable through non-mechanical controls includes a panel with a passageway, a movable seat mounted on the panel with a second passageway in communication with the first passageway, a driver interface that is movable with respect to the seat and usable for operating the vehicle via a connector connected at one end to the driver interface and extending through the first and second passageways.

35 Claims, 9 Drawing Sheets

U.S. PATENT DOCUMENTS

| | | | |
|---|---|---|---|
| 4,216,839 A | | 8/1980 | Gould et al. |
| 4,278,144 A | * | 7/1981 | Perin .......................... 180/329 |
| 4,363,999 A | | 12/1982 | Preikschat |
| 4,478,308 A | * | 10/1984 | Klaassen .................... 180/326 |
| 4,489,977 A | | 12/1984 | Earing, Jr. |
| 4,541,497 A | * | 9/1985 | Riediger et al. ........... 180/6.48 |
| 4,730,691 A | * | 3/1988 | Grigg .......................... 180/329 |
| 5,036,942 A | * | 8/1991 | Loewen ...................... 180/329 |
| 5,038,887 A | * | 8/1991 | Sousek ....................... 180/329 |
| 5,058,016 A | | 10/1991 | Davidovitch |
| 5,086,870 A | * | 2/1992 | Bolduc ....................... 180/333 |
| 5,249,636 A | * | 10/1993 | Kruse et al. ................. 180/21 |
| 5,352,011 A | | 10/1994 | Kihara et al. |
| 5,409,283 A | | 4/1995 | Ban |
| 5,418,437 A | | 5/1995 | Couture et al. |
| 5,921,340 A | * | 7/1999 | Abels ......................... 180/326 |
| 6,039,142 A | * | 3/2000 | Eckstein et al. ............ 180/333 |
| 6,097,286 A | | 8/2000 | Discenzo |
| 6,102,151 A | | 8/2000 | Shimizu et al. |
| 6,394,537 B1 | | 5/2002 | DeRees |
| 6,408,966 B1 | | 6/2002 | Benz et al. |
| 6,424,900 B2 | | 7/2002 | Murray et al. |
| 6,435,584 B1 | | 8/2002 | Bonnville |
| 6,488,345 B1 | | 12/2002 | Woody et al. |
| 6,585,073 B2 | * | 7/2003 | Lorenz ....................... 180/332 |
| 2003/0230447 A1 | * | 12/2003 | Wulfert et al. ............. 180/329 |

FOREIGN PATENT DOCUMENTS

| | | | |
|---|---|---|---|
| ES | 2102293 | 7/1997 | ................. 210/327 |
| GB | 2 178 701 A | 2/1987 | |
| GB | 2 207 096 A | 1/1989 | |

OTHER PUBLICATIONS

Sanket Amberkar, et al., "A System-Safety Process for by-Wire Automotive Systems", SAE Technical Paper, 2000-01-1056, SAE World Congress, Detroit, MI, Mar. 2000.

Edmunds.com Editors, "Why Drive-by-Wire?", The New York Times, Nov. 29, 2000.

* cited by examiner

MULTI-DIRECTIONAL DRIVE

CROSS REFERENCE TO RELATED APPLICATIONS

This application claims the benefit of U.S. Provisional Application 60/337,994 filed Dec. 7, 2001, which is hereby incorporated by reference.

TECHNICAL FIELD

This invention relates to a vehicle adapted to permit driving facing the direction of travel in a multitude of directions and including non-mechanical controls adaptable for driving the vehicle.

BACKGROUND OF THE INVENTION

The steering, braking and acceleration controls and control systems on a vehicle are not designed to be responsive to a change in position of a driver. Thus, although the vehicle may include a driver's seat that is rotatable, allowing the driver to shift his position, the controls typically do not accommodate the change in position. This requires that the driver navigate the vehicle relative to the directions (forward, reverse, left, right) associated with an original seat position with respect to which the steering, braking and acceleration control systems are designed. These system limitations create less than optimal convenience for the driver. Controlling the steering, braking and acceleration functions of a vehicle in any direction other than the forward facing direction of the driver is inherently more difficult.

SUMMARY OF THE INVENTION

The invention serves the primary purpose of allowing a driver to operate a vehicle in the forward direction from a multitude of different rotational and horizontally translatable positions of a driver's seat with respect to a frame in the vehicle. In other words, the driver may drive the vehicle in a plurality of directions of travel corresponding with a plurality of forward-facing orientations of the driver's seat. The invention includes an embodiment that enables the driver to operate the vehicle from a forward position of a different seat (i.e., the driver may move to a different seat). A change in direction of travel associated with a change in seat position is communicated to at least one of the steering system, braking system and energy conversion system to allow the driver to navigate the vehicle relative to his new direction of travel. A change in direction of travel associated with a change in seat position also causes a change in distribution of vehicle load with respect to the new direction of travel of the vehicle. The steering, braking and energy conversion (including accelerating and decelerating) functions of a vehicle are affected by the distribution of vehicle load. Vehicle load distribution data is generally factored into the design of the steering system, braking system and energy conversion systems of a vehicle. The invention includes a mechanism for providing feedback to these systems of a change in driver's seat position and a change in vehicle load distribution data associated with the change in the driver's seat position.

Accordingly, a drivable vehicle includes a frame, a drive-by-wire control mounted with respect to the frame and operable by wire, a driver's seat connected to the frame and rotatable with respect to the frame in one embodiment and in another embodiment also horizontally translatable with respect to the frame, and having an operator interface operatively connectable to the drive-by-wire control for driving the vehicle. The operator interface is usable or operable to drive the vehicle in a multitude of new forward directions (i.e. new directions of travel) associated with changes in position of the driver's seat.

In one embodiment, the vehicle also includes a connector operatively associated with the operator interface and configured for complementary engagement with a drive-by-wire connector port mounted with respect to the frame and operatively connected to the drive-by-wire control.

A more specific embodiment of the invention is a vehicle that has a frame, at least three wheels operable with respect to the frame, a steering system, braking system and energy conversion system, each of which is mounted with respect to the frame, operably connected to at least one wheel and responsive to non-mechanical control systems. The vehicle has a seat rotatable to a plurality of different rotational positions with respect to the frame. The invention includes a configuration wherein the seat is rotatable only between a first position facing one longitudinal direction and a second position facing an opposite longitudinal direction. The vehicle also has an operator interface that is operably connected to at least one of the steering system, braking system and energy conversion system for driving the vehicle, and that is movable with respect to the frame in a manner that does not interfere with the rotation of the seat. The operator interface is operable or usable for operating the at least one of the steering, braking and energy conversion systems by hand and without foot action when the seat is in any of the plurality of different rotational positions with respect to the frame. The invention includes a configuration wherein the operator interface is mounted in a fixed position with respect to the seat and movable therewith in a manner that does not interfere with the rotation of the seat.

The invention includes an embodiment wherein a sensor is operably connected to the seat and capable of sensing a change in position of the seat. This embodiment further includes a control unit operably connected to the sensor and to the steering system, the braking system and the energy conversion system wherein the control unit is programmable to adjust the non-mechanical control signals sent to the steering system, the braking system and the energy conversion system based upon a redistribution of the vehicle load distribution data related to the change in seat position.

In a further embodiment, a control cockpit is adapted for use on a vehicle that is controllable through at least one drive-by-wire connector port. The control cockpit includes a panel adapted to mount on the vehicle and having a first passageway adapted to communicate with the at least one connector port. The control cockpit also includes at least one seat mounted on the panel in a manner to be horizontally movable to a plurality of different positions with respect to the vehicle when the control cockpit is mounted on the vehicle. The at least one seat has a second passageway in communication with the first passageway on the panel. The control cockpit also includes at least one driver interface movable with the at least one seat and operable or usable for operating the vehicle when the control cockpit is mounted on the vehicle. In one embodiment of the invention, the at least one driver interface is mounted in a fixed position with respect to the at least one seat and rotatable therewith. The control cockpit also includes at least one connector configured for connection with the at least one drive-by-wire connector port at one end and connected at the other end to the at least one driver interface while extending through the first passageway and second passageway. In another embodiment of the invention, the control cockpit also includes at least one sensor operably connected with respect to the at least one seat and capable of sensing a horizontal change in position of the at least one seat with respect to the frame and another connector operably connected to the at least one sensor at one end and configured for connection with the at least one connector port at the other end while extending through at least one of the first and second passageways. In this configuration, the at least one sensor and the other at least one connector may be used to adjust the control of the vehicle in response to the position of the at least one seat.

The above objects, features, and advantages, and other objects, features and advantages of the present invention are readily apparent from the following detailed description of the best mode for carrying out the invention when taken in connection with the accompanying drawings.

DESCRIPTION OF THE PREFERRED EMBODIMENTS

Figure 1:
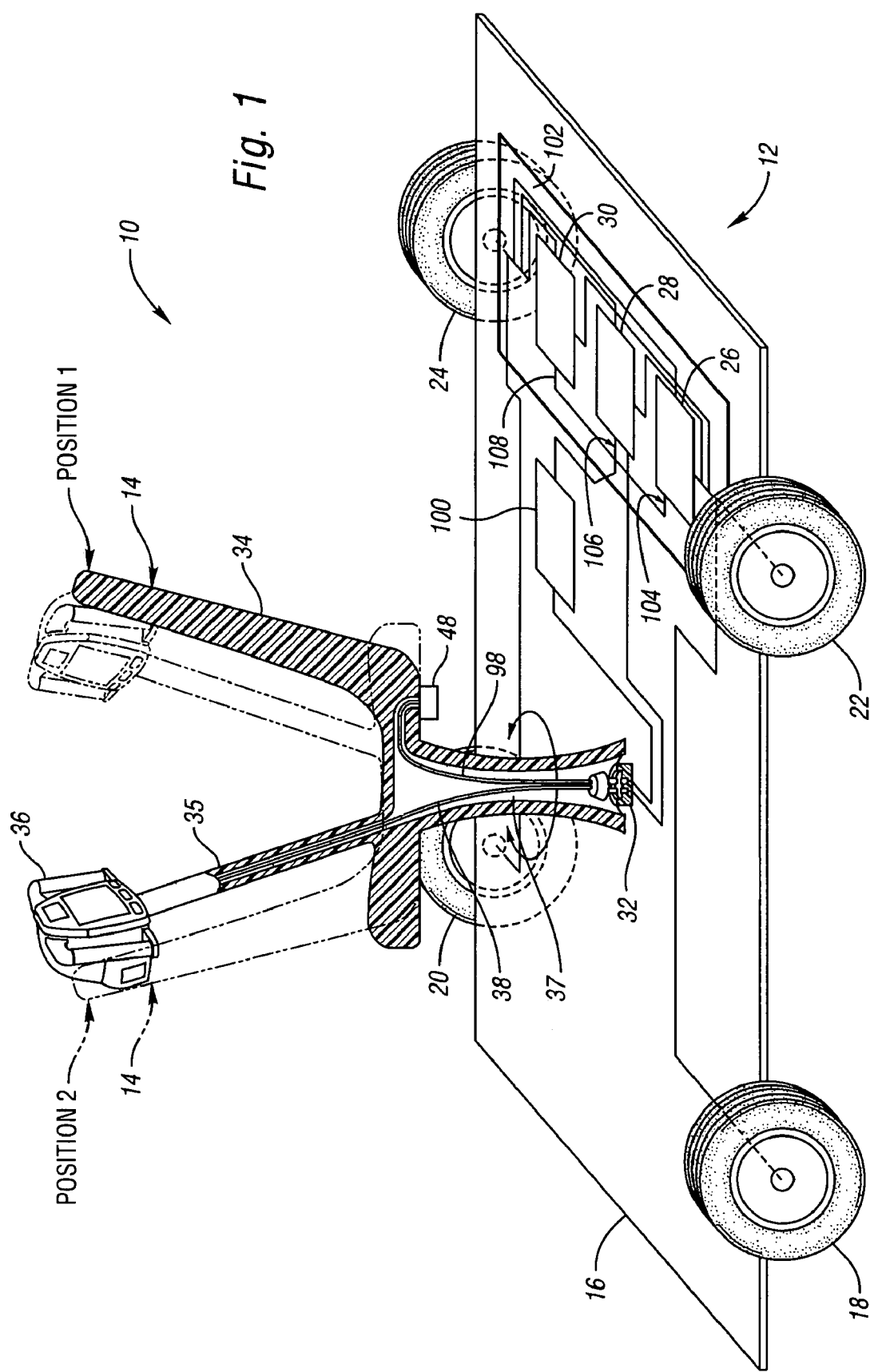
FIG. 1 is a perspective side schematic illustration of a vehicle in accordance with an embodiment of the invention, the vehicle having a seat rotatable between two positions, a sensor operably connected to the seat and a control unit operably connected to the sensor and to a steering system, a braking system and an energy conversion system.

Referring to FIG. 1, one embodiment of a vehicle 10 in accordance with the invention includes a chassis 12 and a driver's seat assembly 14. The vehicle 12 is preferably an automobile but the invention also contemplates that the vehicle may be a tractor, forklift or other industrial or commercial vehicle. The invention also has utility in a non-automotive vehicle.

The chassis 12 includes a frame 16 having four wheels 18, 20, 22, 24 that are operable with respect to the frame 16. The chassis 12 is preferably an automobile but the invention also contemplates that the vehicle may be a tractor, forklift, or other industrial or commercial vehicle. Those skilled in the art will recognize materials and fastening methods suitable for attaching the wheels 18, 20, 22 and 24 to the frame 16.

The chassis 12 further includes a steering system 26, a braking system 28 and an energy conversion system 30, each of which is mounted with respect to the frame 16 and responsive to non-mechanical control signals. Embodiments of such systems are described subsequently with respect to FIG. 2 through FIG. 7.

The structural frame 16 provides a rigid structure to which the steering system 26, braking system 28 and energy conversion system 30 as well as the wheels 18, 20, 22, 24 are mounted, as shown in FIG. 1, and is configured to support an attached body such as an automotive body. A person of ordinary skill in the art will recognize that the structural frame 16 can take many different forms. For example, the structural frame 16 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal or other suitable material, with other formations to accommodate various system components. The structural frame may also be integrated with various vehicle components.

The chassis 12 includes a drive-by-wire connector port 32 that is mounted with respect to the frame 16 and operably connected to the steering system 26, the braking system 28, and the energy conversion system 30. Persons skilled in the art will recognize various methods for mounting the drive-by-wire connector port 32 to the frame 16. In the preferred embodiment, the drive-by-wire connector port 32 is located on the top face of the frame 16, in close proximity to the driver's seat 14. Various embodiments of the manner for operably connecting the drive-by-wire connector port 32 to the steering system 26, the braking system 28 and the energy conversion system 30 are described subsequently with respect to FIG. 2 through FIG. 7.

The driver's seat assembly 14 includes a seat 34. In the embodiment depicted in FIG. 1, the seat 34 is rotatable with respect to the frame about a vertical axis of rotation between a first position facing in one longitudinal direction and a second position facing in the opposite direction. The seat 34 is also rotatable to a multitude of different positions between position 1 and position 2. In position 1, the seat 34 faces a direction perpendicular to an imaginary line running through the center of wheels 18, 20. In position 2, the seat 34 faces the opposite direction, perpendicular to an imaginary line running through the center of wheels 18, 20. The invention contemplates a seat 34 rotatable between many other first positions and opposite second positions. In fact, the invention contemplates a seat that may be both rotatable and horizontally translatable to a plurality of different positions with respect to the frame 16. The invention also contemplates more than one seat that may be rotatable and translatable in such a manner.

The driver's seat assembly 14 also includes an operator interface 36 that is operable for driving the chassis 12 through the drive-by-wire connector port 32. The operator interface 36 may be fixed with respect to the seat 34 or movable in relation thereto. In the preferred embodiment of FIG. 1, the operator interface 36 is represented as being rigidly fixed to the seat 34. In FIG. 1, the operator interface 36 is depicted as being connected to the drive-by-wire connector port 32 via a connector 38 for transmitting electrical signals from the operator interface 36 to the drive-by-wire connector port 32 when the connector 38 is interfitted therewith. The embodiment depicted in FIG. 1 includes a passageway 37 through the seat 34 and through mounting structure 35 for the operator interface 36 through which the connector 38 extends. The invention contemplates other configurations in which the connector 38 connects the operator interface 36 to the drive-by-wire connector port 32 by means other than a passageway. Furthermore, the invention contemplates configurations in which the operator interface connects to or communicates with at least one of the steering system 26, the braking system 28 and the energy conversion system 30 without the use of a connector 38.

Those skilled in the art will recognize various designs for an operator interface 36 capable of transforming directional input from a driver into an electrical signal to be transmitted to the drive-by-wire connector port 32 of the chassis 12 if the operator interface 36 is operably connected to the drive-by-wire connector port 32 by the connector 38. The operator interface 36 could include one or more manual joysticks, and may further include a touch screen or keyboard design.

The drive-by-wire connector port 32 of the preferred embodiment may perform multiple functions, or select combinations thereof. First, the drive-by-wire connector port 32 may function as an electrical power connector, i.e., it may be configured to transfer electrical energy generated by components on the vehicle 10 to the operator interface 36 or other non-frame destination. Second, the drive-by-wire connector port 32 may function as a control signal receiver, i.e., a device configured to transfer non-mechanical control signals from a non-vehicle source, such as the operator interface 36, to controlled systems including the steering system 26, the braking system 28, and the energy conversion system 30. Third, the drive-by-wire connector port 32 may function as a feedback signal conduit through which feedback signals are made available to a vehicle driver. Fourth, the drive-by-wire connector port 32 may function as an external programming interface through which software containing algorithms and data may be transmitted for use by controlled systems. Fifth, the drive-by-wire connector port 32 may function as an information conduit through which sensor information and other information is made available to a vehicle driver. The drive-by-wire connector port 32 may thus function as a communications and power "umbilical" port through which all communications between the chassis 12 and the attached operator interface 36 and other attachments to the frame are transmitted. The drive-by-wire connector port 32 is essentially an electrical connector. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

The steering system 26 is housed in the chassis 12 and is operably connected to the front wheels 18, 20. Preferably, the steering system 26 is responsive to non-mechanical control signals. In the preferred embodiment, the steering system 26 is by-wire. A by-wire system is characterized by control signal transmission in electrical form. In the context of the present invention, "by-wire" systems, or systems that are controllable "by-wire," include systems configured to receive control signals in electronic form via a control signal receiver, and respond in conformity to the electronic control signals.

Figure 2:
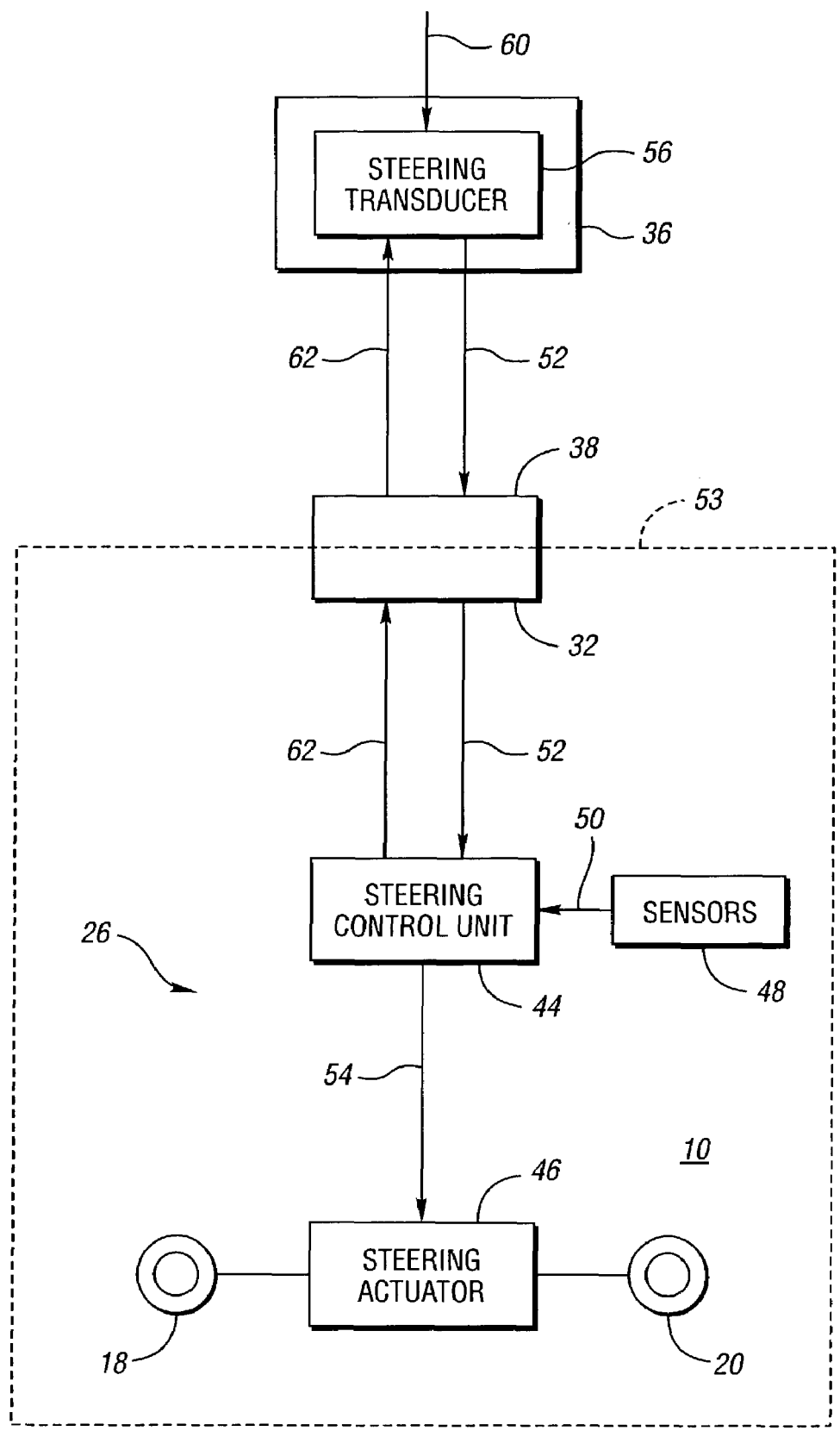
FIG. 2 is a schematic illustration of a steering system for use with the vehicle of FIG. 1.

FIG. 2 is a schematic illustration of a steering system for use with the vehicle of FIG. 1. The by-wire steering system 26 of the preferred embodiment includes a steering control unit 44, and a steering actuator 46. Sensors 48 are located on the vehicle 10 and transmit sensor signals 50 carrying information concerning the state or condition of the vehicle 10 and its component systems. The sensors 48 may include position sensors, velocity sensors, acceleration sensors, pressure sensors, force and torque sensors, flow meters, temperature sensors, etc. The steering control unit 44 receives and processes sensor signals 50 from the sensors 48 and electrical steering control signals 52 from the drive-by-wire connector port 32, and generates steering actuator control signals 54 according to a stored algorithm. A control unit typically includes a microprocessor, ROM and RAM and appropriate input and output circuits of a known type for receiving the various input signals and for outputting the various control commands to the actuators. Sensor signals 50 may include yaw rate, lateral acceleration, angular wheel velocity, tie-rod force, steering angle, chassis velocity, etc.

The steering actuator 46 is operably connected to the front wheels 18, 20 and configured to adjust the steering angle of the front wheels 18, 20 in response to the steering actuator control signals 54. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 46 is an electric drive motor configured to adjust a mechanical steering rack.

Referring to FIG. 2, the preferred embodiment of the vehicle 10 is configured such that it is steerable by any source of compatible electrical steering control signals 52 connected to the drive-by-wire connector port 32. The drive-by-wire connector port 32 interfits with the connector 38 at the connector interface 53. FIG. 2 depicts a steering transducer 56 located within the operator interface 36 and connected to the complementary connector 38. Transducers convert the mechanical control signals of a vehicle driver to non-mechanical control signals. When used with a by-wire system, transducers convert the mechanical control signals to electrical control signals usable by the by-wire system. A vehicle driver inputs control signals in mechanical form by turning a wheel, gripping or turning a handle or handles, pressing a button, or the like. Transducers utilize sensors, typically position and force sensors, to convert the mechanical input to an electrical signal.

The complementary connector 38 is coupled with the drive-by-wire connector port 32 of the connector interface 53. The steering transducer 56 converts vehicle driver-initiated mechanical steering control signals 60 to electrical steering control signals 52 which are transmitted via the connector port 32 to the steering control unit 44. In the preferred embodiment, the steering control unit 44 generates steering feedback signals 62 for use by a vehicle driver and transmits the steering feedback signals 62 through the drive-by-wire connector port 32. Some of the sensors 48 monitor linear distance movement of a steering rack and vehicle speed. This information is processed by the steering control unit 44 according to a stored algorithm to generate the steering feedback signals 62.

In the context of the present invention, a "by-wire" system may be an actuator connected directly to the drive-by-wire connector port 32. An alternative by-wire steering system 26' within the scope of the claimed invention is depicted schematically in FIG. 3, wherein like reference numbers refer to like components from FIG. 2. A steering actuator 46 configured to adjust the steering angle of the front wheels 18, 20 is connected directly to the drive-by-wire connector port 32. In this embodiment, a steering control unit 44' and a steering transducer 56 may be located in the operator interface 36. The steering transducer 56 would transmit electrical steering control signals 52 to the steering control unit 44', and the steering control unit 44' would transmit steering actuator control signals 54 to the steering actuator 46 via the drive-by-wire connector port 32. Sensors 48 positioned on the vehicle 12 transmit sensor signals 50 to the steering control unit 44' via the drive-by-wire connector port 32 and the complementary connector 38.

Examples of steer-by-wire systems are described in U.S. Pat. Nos. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 28 is mounted to the frame 16 and is operably connected to the wheels 18, 20, 22, 24. The braking system 28 is configured to be responsive to non-mechanical control signals. In the preferred embodiment, the braking system 28 is by-wire, as depicted schematically in FIG. 4, wherein like reference numbers refer to like components from FIGS. 2 and 3. Sensors 48 transmit sensor signals 50 carrying information concerning the state or condition of the vehicle 10 and its component systems to a braking control unit 64. The braking control unit 64 is connected to the drive-by-wire connector port 32 and is configured to receive electrical braking control signals 66 via the drive-by-wire connector port 32. The braking control unit 64 processes the sensor signals 50 and the electrical braking control signals 66 and generates braking actuator control signals 68 according to a stored algorithm. The braking control unit 64 then transmits the braking actuator control signals 68 to braking actuators 70, 72, 74, 76 which act to reduce the angular velocity of the wheels 18, 20, 22, 24. Those skilled in the art will recognize the manner in which the braking actuators 70, 72, 74, 76 act on the wheels 18, 20, 22, 24. Typically, actuators cause contact between friction elements, such as pads and disc rotors. Optionally, an electric motor may function as a braking actuator in a regenerative braking system.

The braking control unit 64 may also generate braking feedback signals 78 for use by a vehicle driver and transmit the braking feedback signals 78 through the drive-by-wire connector port 32. In the preferred embodiment, the braking actuators 70, 72, 74, 76 apply force through a caliper to a rotor at each wheel. Some of the sensors 48 measure the applied force on each caliper. The braking control unit 64 uses this information to ensure synchronous force application to each rotor.

Referring again to FIG. 4, the preferred embodiment of the vehicle 10 is configured such that the braking system 28 is responsive to any source of compatible electrical braking control signals 66. A braking transducer 80 may be located in the operator interface 36 and connected to a complementary connector 38 interfitted with the drive-by-wire connector port 32 at the connector interface 53. The braking transducer 80 converts vehicle driver-initiated mechanical braking control signals 82 into electrical form and transmits the electrical braking control signals 66 to the braking control unit via the drive-by-wire connector port 32. In the preferred embodiment, the braking transducer 80 includes two hand-grip type assemblies. The braking transducer 80 includes sensors that measure both the rate of applied pressure and the amount of applied pressure to the hand-grip assemblies, thereby converting mechanical braking control signals 82 to electrical braking control signals 66. The braking control unit 64 processes both the rate and amount of applied pressure to provide both normal and panic stopping.

Figure 3:
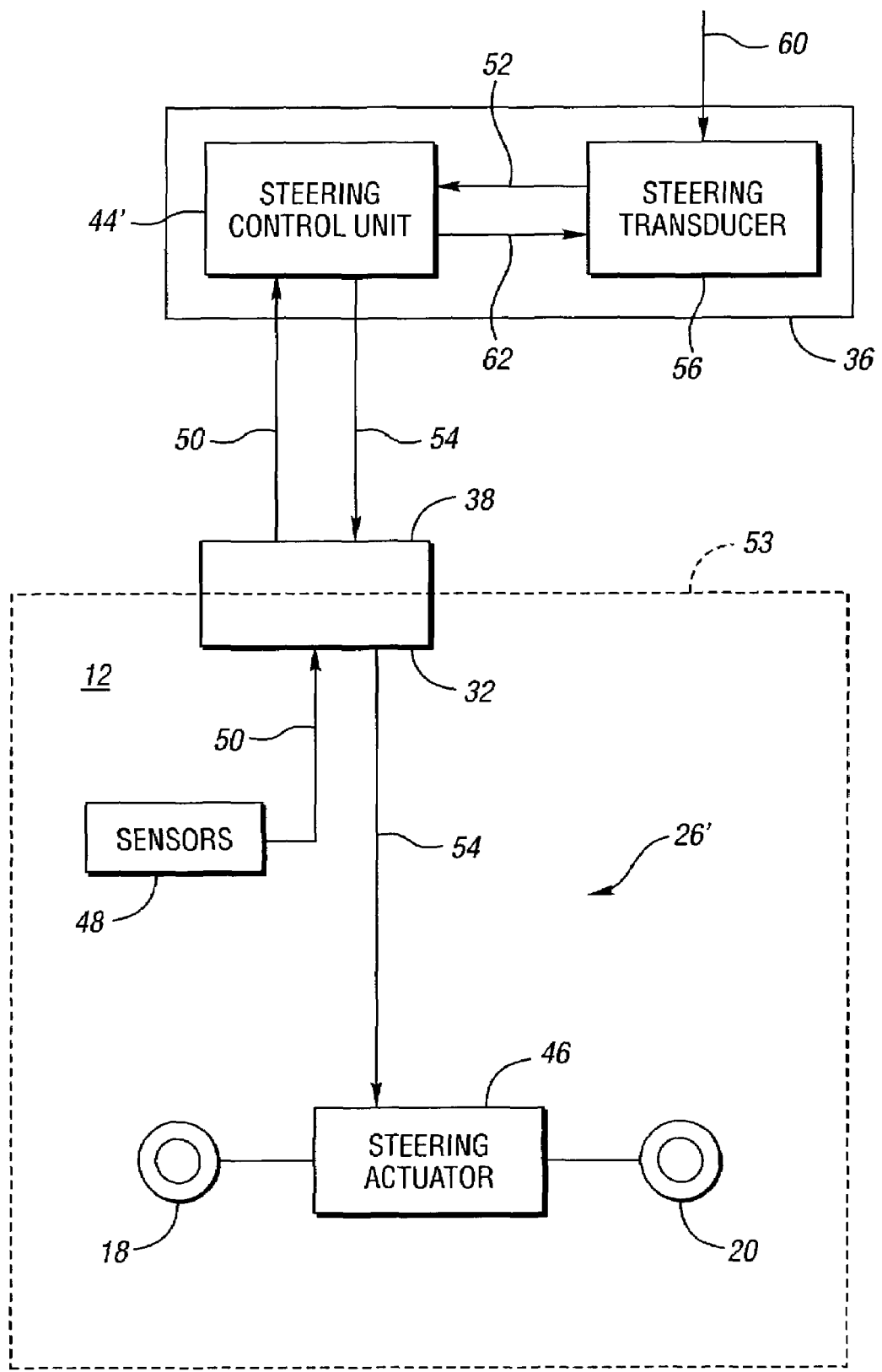
FIG. 3 is a schematic illustration of an alternative steering system for use with the vehicle of FIG. 1.
Figure 4:
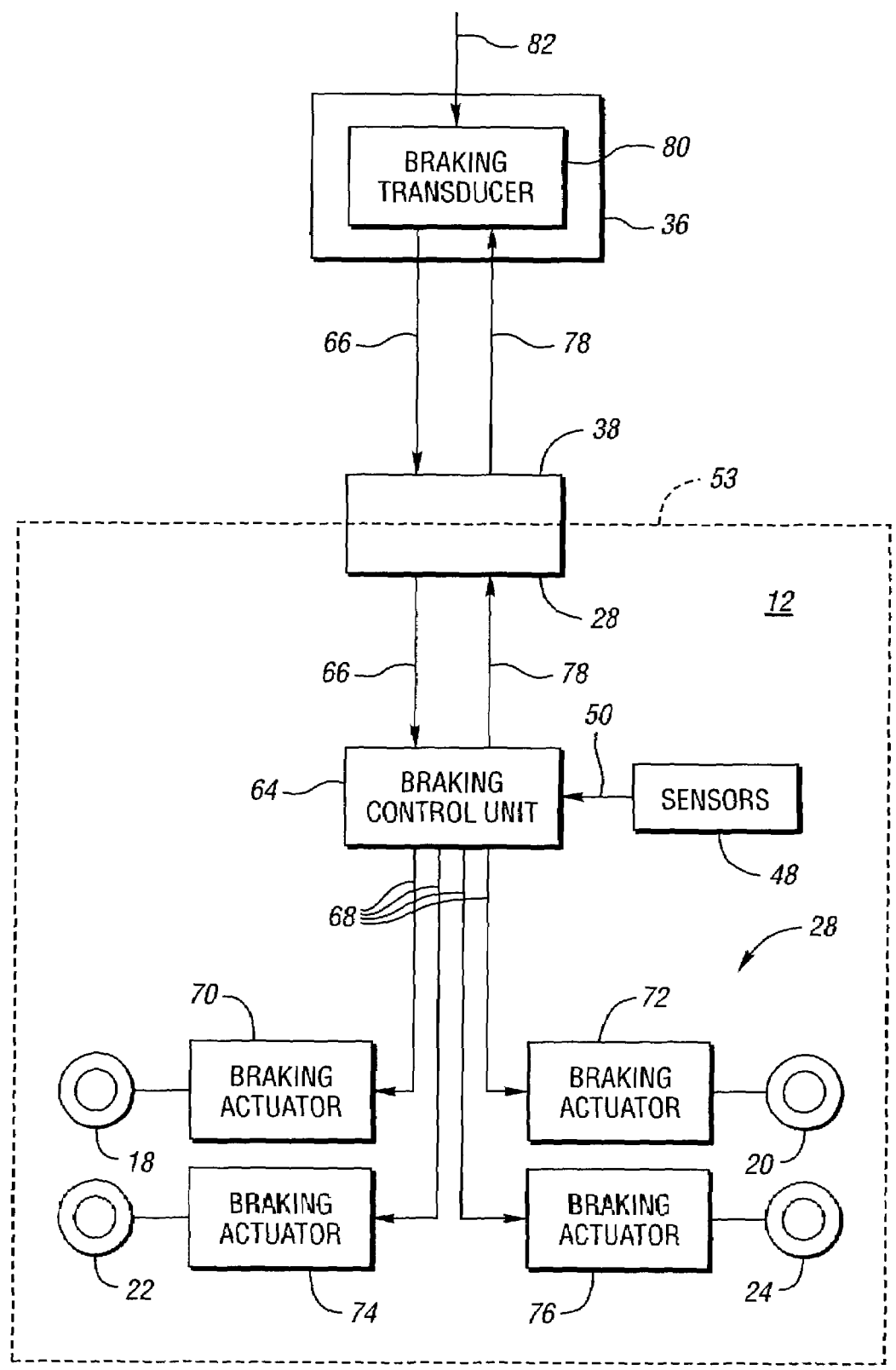
FIG. 4 is a schematic illustration of a braking system for use with the vehicle of FIG. 1.
Figure 5:
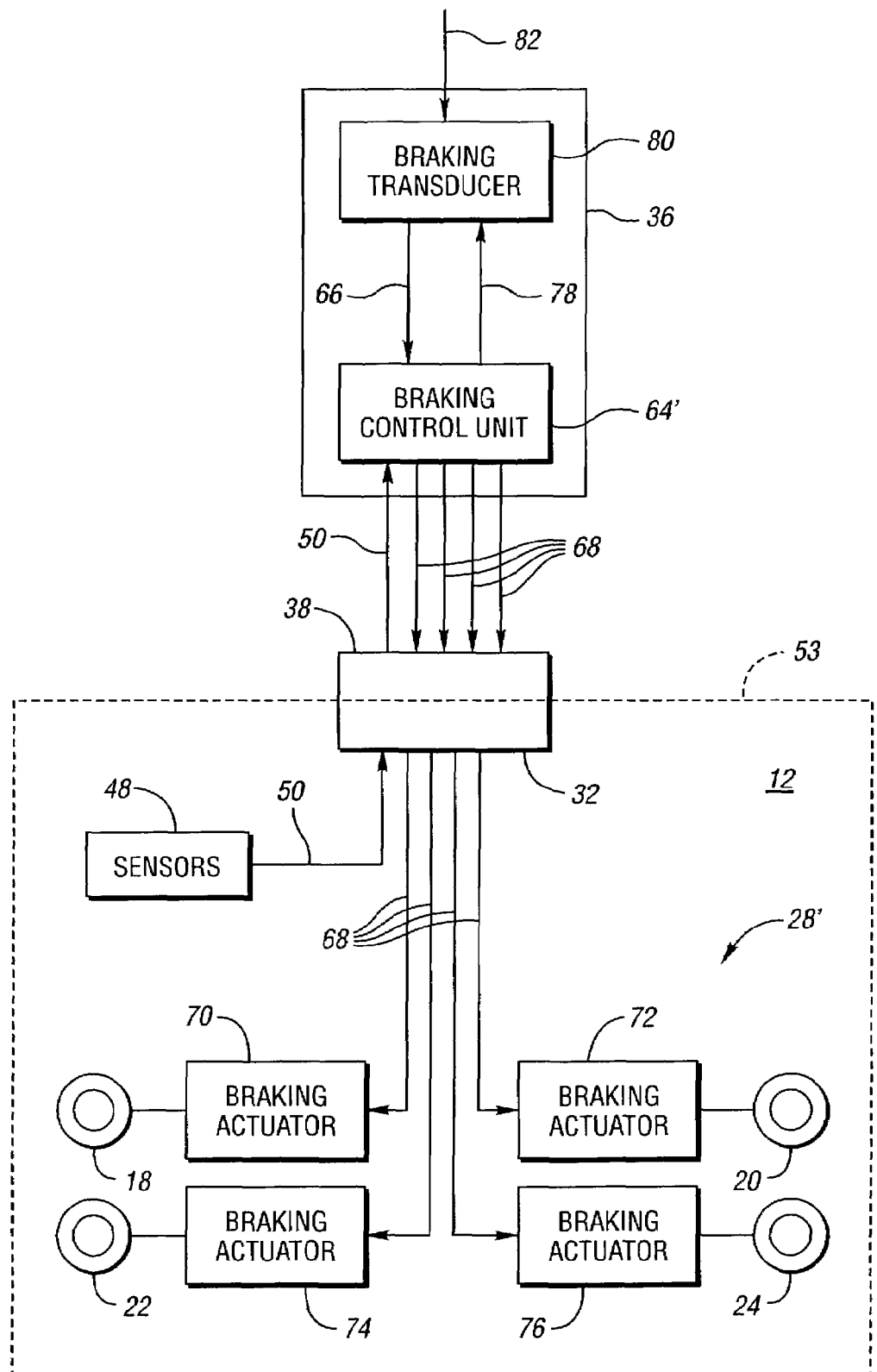
FIG. 5 is a schematic illustration of an alternative braking system for use with the vehicle of FIG. 1.

An alternative brake-by-wire system 28' within the scope of the claimed invention is depicted in FIG. 5, wherein like reference numbers refer to like components from FIGS. 2–4. The braking actuators 70, 72, 74, 76 and sensors 48 are connected directly to the drive-by-wire connector port 32. In this embodiment, a braking control unit 64' may be located within the operator interface 36. A braking transducer 80 within the operator interface 36 transmits electrical braking control signals 66 to the braking control unit 64', and the braking control unit 64' transmits braking actuator signals 68 to the braking actuators 70, 72, 74, 76 via the connector 38 and to the drive-by-wire connector port 32.

Examples of brake-by-wire systems are described in U.S. Pat. Nos. 5,366,281, issued Nov. 22, 2994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Figure 6:
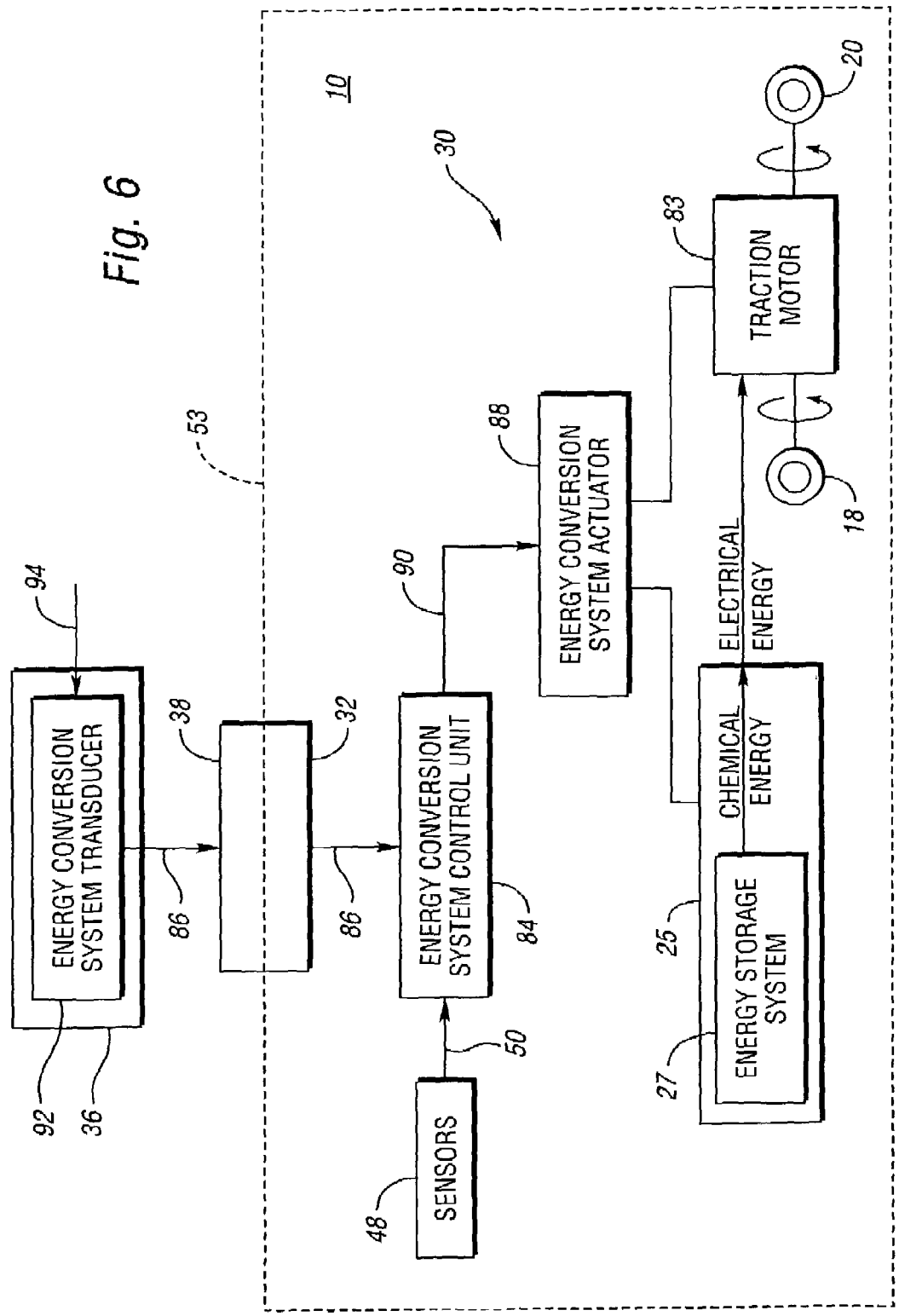
FIG. 6 is a schematic illustration of an energy conversion system for use with the vehicle of FIG. 1.

FIG. 6 is a schematic illustration of an energy conversion system 30 for use with the vehicle 10 depicted in FIG. 1. The energy conversion system 30 includes an energy converter 25 that converts the energy stored in an energy storage system 27 to mechanical energy that propels the vehicle 10. In the preferred embodiment, depicted in FIG. 6, the energy converter 25 is operably connected to a traction motor 83. The energy converter 25 converts chemical energy into electrical energy, and the traction motor 83 converts the electrical energy to mechanical energy, and applies the mechanical energy to rotate the front wheels 18, 20. Those skilled in the art will recognize many types of energy converters 25 that may be employed within the scope of the present invention.

The energy conversion system 30 is configured to respond to non-mechanical control signals. The energy conversion system 30 of the preferred embodiment is controllable by-wire, as depicted in FIG. 6. An energy conversion system control unit 84 is connected to the drive-by-wire connector port 32 from which it receives electrical energy conversion system control signals 86, and sensors 48 from which it receives sensor signals 50 carrying information about various vehicle conditions. In the preferred embodiment, the information conveyed by the sensor signals 50 to the energy conversion system control unit 84 includes vehicle velocity, electrical current applied, rate of acceleration of the vehicle, and motor shaft speed to ensure smooth launches and controlled acceleration. The energy conversion system control unit 84 is connected to an energy conversion system actuator 88, and transmits energy conversion system actuator control signals 90 to the energy conversion system actuator 88 in response to the electrical energy conversion system control signals 86 and sensor signals 50 according to a stored algorithm. The energy conversion system actuator 88 acts on the energy conversion system 30 or traction motor 83 to adjust energy output. Those skilled in the art will recognize the various methods by which the energy conversion system actuator 88 may adjust the energy output of the energy conversion system.

An energy conversion system transducer 92 may be located in the operator interface 36 and connected to a complementary connector 38 engaged with the drive-by-wire connector port 32. The energy conversion system transducer 92 is configured to convert mechanical energy conversion system control signals 94 to electrical energy conversion system control signals 86.

Figure 7:
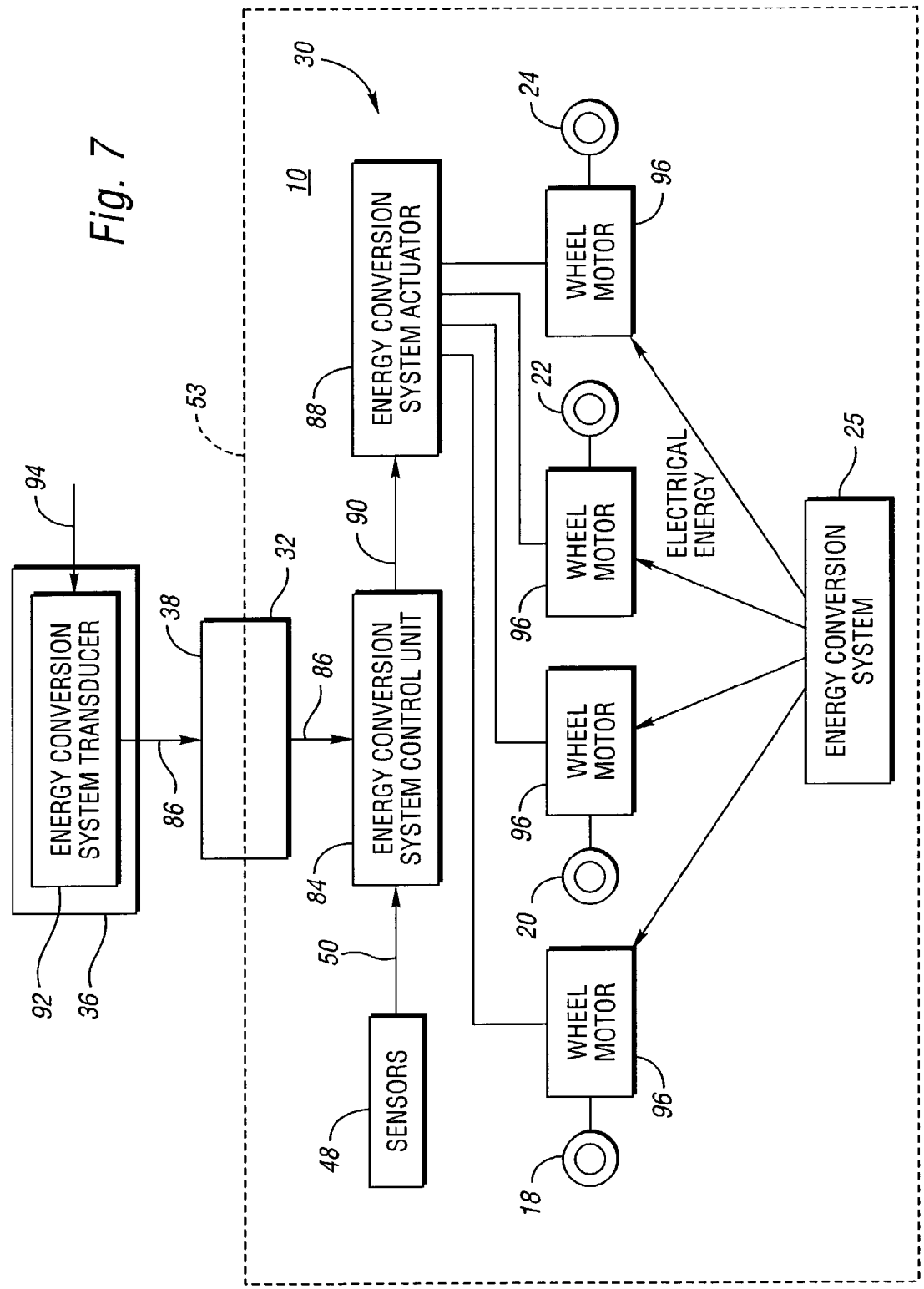
FIG. 7 is a schematic illustration of an alternative energy conversion system for use with the vehicle of FIG. 1.

In another embodiment of the invention, as shown schematically in FIG. 7, wherein like reference numbers refer to like components from FIGS. 2-6, wheel motors 96, also known as wheel hub motors, are positioned at each of the four wheels 18, 20, 22, 24. Optionally, wheel motors 96 may be provided at only the front wheels 18, 20 or only the rear wheels 22, 24. The use of wheel motors 96 reduces the height of the vehicle 10 compared to the use of traction motors, and therefore may be desirable for certain uses.

Referring again to FIG. 1, a sensor 48 is connected to the seat 34. The sensor 48 is operably connected to the seat 34 and to a connector 98, also referred to as a second connector. The sensor 48 is designed to sense a rotational change in position of the seat 34 and transmit information concerning the change in the form of an electrical current through the connector 98 to a control unit 100 located in the chassis 12. The control unit 100 is operably connected to the steering system 26, the braking system 28 and the energy conversion system 30. The entire assembly of drive-by-wire connector port 32, control unit 100, steering system 26, the braking system 28 and energy conversion system 30 is also referred to in the invention as a drive-by-wire control 102. The control unit 100 is programmed to adjust the nonmechanical control signals 104, 106, 108 sent to the steering system 26, the braking system 28 and the energy conversion system 30 based upon a rotational or translational change in seat position communicated via the sensor 48 and the connector 98. The control unit 100 is also programmed to adjust the non-mechanical control signals 104, 106, 108 sent to the steering system 26, the braking system 28 and the energy conversion system 30 based upon a redistribution of vehicle load distribution data related to the rotational change in seat position. Those skilled in the art will recognize a variety of ways to program the control unit to respond to such input factors. In the embodiment of the invention depicted in FIG. 1, the steering system 26, the braking system 28 and the energy conversion system 30 are calibrated based upon the rotational change in seat position communicated by the control unit 100 via the non-mechanical control signals 104, 106, 108. The steering system 26, the braking system 28 and the energy conversion system 30 are further calibrated based upon a set of predetermined vehicle load distribution data communicated by the control unit 100 via the non-mechanical control signals 104, 106, 108. Those skilled in the art will recognize a variety of ways to calibrate these systems based upon the seat position, the vehicle load distribution data and changes therein. In FIG. 1, the control unit 100 is depicted as a separate control unit dedicated to the sensor 48 attached to the seat 34. The invention also contemplates that the functions of the control unit 100 could be integrated with the steering control unit 44 depicted in FIG. 2 and discussed above, the braking control unit 64 depicted in FIG. 4 and discussed above and the energy conversion control unit 84 depicted in FIG. 6 and discussed above.

Figure 8:
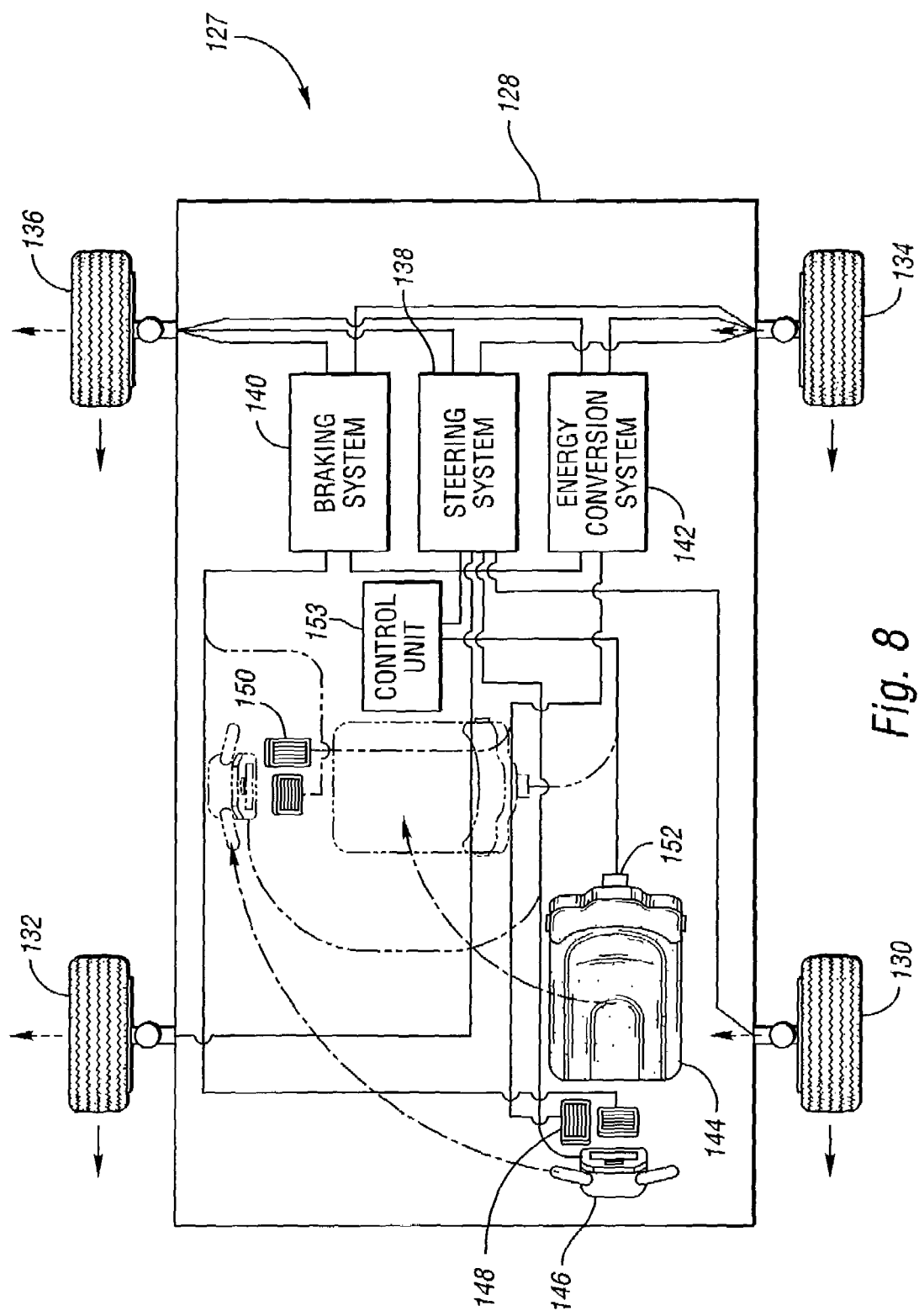
FIG. 8 is a schematic illustration of a vehicle in accordance with an embodiment of the invention, the vehicle having an operator interface operably connected to a steering system, a seat rotatable and translatable to a multitude of positions, a sensor operably connected to the seat and a control unit operably connected to the sensor and to a steering system, a braking system and an energy conversion system.

Another embodiment of the invention is depicted in FIG. 8. This embodiment is of a drivable vehicle 127 including a frame 128 and four wheels 130, 132, 134, 136 operable with respect to the frame 128 in a manner to permit movement of the wheels 130, 132, 134, 136 in all horizontal directions while remaining in contact with the ground (i.e., wheels that will move in a 360 degree range about a starting point). Spherical wheels or wheels designed to pivot about the point of contact with the ground, such as a shopping cart-type wheel or castors, would perform this function. Those skilled in the art will recognize a multitude of designs and attachment mechanisms for wheels permitting movement in a 360 degree range.

The embodiment depicted in FIG. 8 also includes a steering system 138, a braking system 140 and an energy conversion system 142, each of which is operably connected to at least one wheel and is responsive to by-wire control signals. In the embodiment depicted in FIG. 8, the steering system 138 and the braking system 140 are operably connected to all four wheels while the energy conversion system is connected to only two wheels 134, 136. The embodiment includes a driver's seat 144 that is connected with respect to the frame 128 in a manner to permit horizontal rotational and translatable movement of the seat 144 with respect to the frame 128 (i.e. movement tracking the phantom curved arrows of FIG. 8). Those skilled in the art will recognize how to connect the seat 144 with respect to the frame 128 in this manner, perhaps through the use of rolling tracks in the frame to which the lower portion of the seat is connected. The invention also contemplates multiple seats from which the vehicle may be controlled, each of which may be rotatable and horizontally translatable with respect to the frame. The embodiment depicted in FIG. 8 includes an operator interface 146 operably connected to the steering system 138. The braking system 140 and the energy conversion system 142 are operably connected to redundant sets of foot pedals 148, 150 fixed at different locations with respect to the frame. The operator interface 146 is usable to drive the vehicle from a multitude of different seat positions. Necessarily, a driver of the vehicle would need to be able to reach at least one of the sets of foot pedals 148, 150 in order to control the vehicle. The invention contemplates embodiments with more than two sets of foot pedals to afford more flexibility in seat location to the driver. Furthermore, the invention contemplates embodiments in which the steering system 138, braking system 140 and energy conversion system 142 are all controlled through the operator interface 146 such that no foot pedals or other separate control interfaces are necessary. The invention contemplates that the operator interface 146 may be controlled either through direct contact by the driver, such as hand-grip control or keyboard entry, or remote control by the driver when the driver is still in the driver's seat, such as when the driver rotates the seat away from the operator interface 146. Those skilled in the art will recognize a variety of ways for the driver to interact with the driver interface 146 remotely.

The embodiment depicted in FIG. 8 includes a sensor 152 attached to the driver's seat 144 and capable of sensing a change in position of the seat 144. A control unit 153 is operably connected to the sensor 152 and communicates the change in position of the seat to the steering system 138, the braking system 140 and the energy conversion system 142. The steering system 138, the braking system 140 and the energy conversion system 142 are each calibrated based upon a set of predetermined vehicle load distribution data. The control unit 153 is programmed to adjust the by-wire control signals sent to the steering system 138, the braking system 140 and the energy conversion system 142 based upon a redistribution of the vehicle load distribution data related to a change in seat position.

Figure 9:
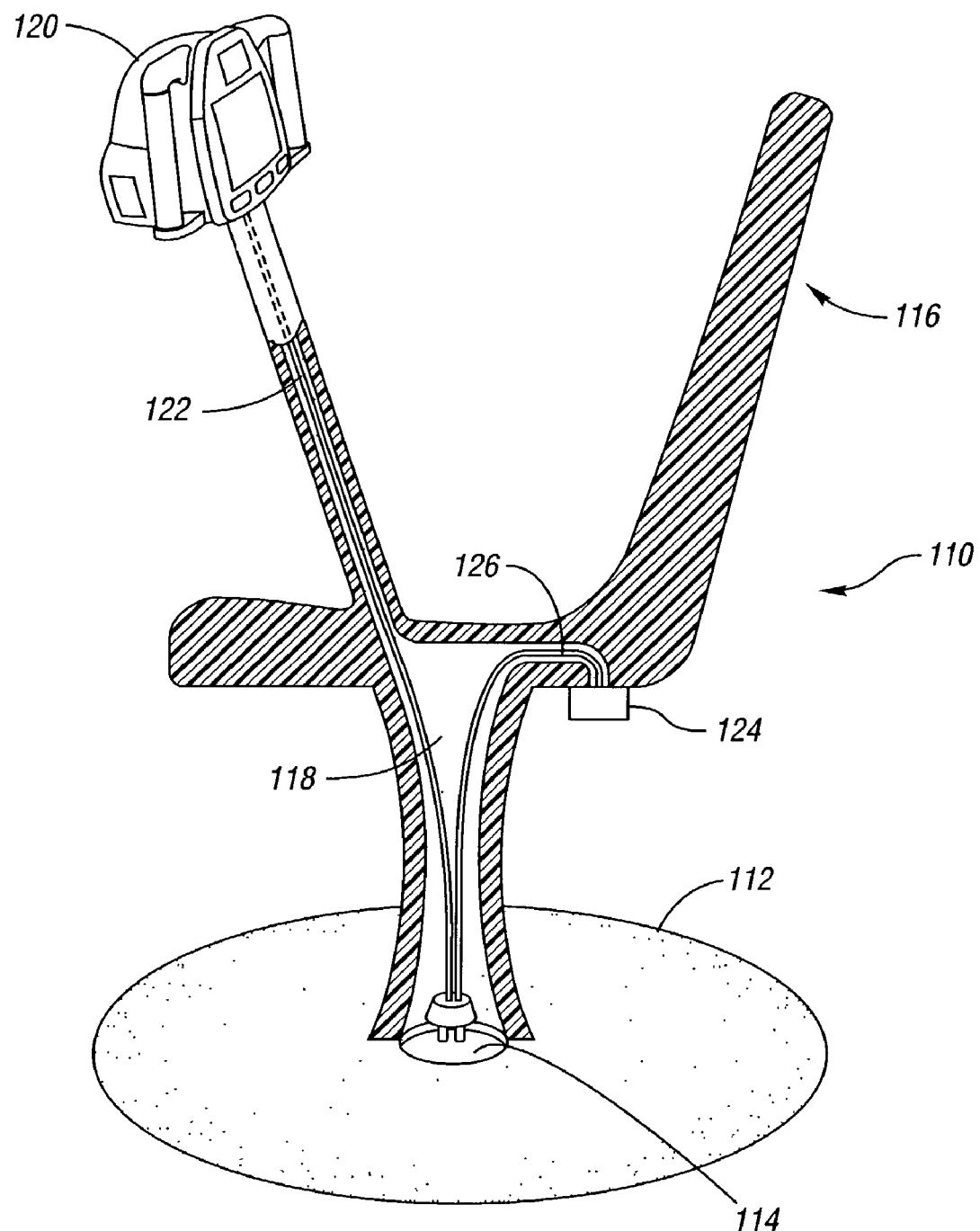
FIG. 9 is a schematic illustration of a control cockpit in accordance with an embodiment of the invention, the control cockpit having a driver interface mounted in a fixed position with respect to the seat and rotatable therewith, a sensor operably connected to the seat and a connector operably connected to the sensor, configured for connection with the connector port and extending through at least one of a passageway in the seat and a passageway in a panel.

In another embodiment, the invention is a control cockpit adapted as a supplier subassembly for installation in and use on a vehicle that is controllable through a drive-by-wire connector port. An embodiment of the control cockpit 110 is depicted in FIG. 9. In this embodiment the control cockpit 110 includes a panel 112 that is adapted to mount on the vehicle. Those skilled in the art will recognize a variety of ways to mount the panel 112 to the vehicle including the use of fasteners and adhesives. The panel 112 has structure forming a first passageway 114. The first passageway 114 is depicted in the form of a circular hole. The invention contemplates that the first passageway 114 may take a variety of other shapes and forms. The control cockpit 110 also has a seat 116 that is mounted on the panel 112 in a manner to be horizontally rotatable to a variety of different positions with respect to the vehicle when the control cockpit 110 is mounted on the vehicle. The seat 116 has structure forming a second passageway 118. The second passageway 118 is depicted in FIG. 9 as being in the form of a hollow cylinder running down the length of a base formed in the seat 116. The invention contemplates that the second passageway 118 may take a variety of other shapes and forms. The seat 116 is mounted on the panel 112 in such a manner that the second passageway 118 is in communication with the first passageway 114 in the panel 112. The control cockpit 110 includes a driver interface 120 that is movable with the seat 116. The driver interface 120 is usable for operating the vehicle when the control cockpit 110 is mounted on the vehicle. In the embodiment depicted in FIG. 9, the driver interface 120 is mounted in a fixed position with respect to the seat 116 and is rotatable with the seat 116. The invention also contemplates configurations in which the driver interface 120 is not mounted in a fixed position with respect to the seat 116 but is movable therewith. The control cockpit 110 also includes a connector 122 that is configured for connection on one end with the drive-by-wire connector port on the vehicle. The connector 122 is connected at the other end to the driver interface 120. The connector 122 extends through the first passageway 114 and the second passageway 118 such that it does not interfere with the rotation of the seat 116.

In the embodiment shown in FIG. 9, the control cockpit 110 includes a sensor 124 that is operably connected with respect to the seat 116 and is capable of sensing a rotational change in position of the seat 116. Those skilled in the art will recognize sensors capable of sensing and communicating such a change. The embodiment depicted in FIG. 9 shows the sensor 124 mounted directly to the bottom of the bodily support portion of the seat 116. Other locations and mechanisms for operably connecting the sensor 124 to the seat 116 are also contemplated by the invention. In the embodiment shown in FIG. 9, another connector 126 is operably connected to the sensor 124 at one end and is configured to be connectable with a drive-by-wire control port on the vehicle at the other end to adjust the control of the vehicle in response to the position of the seat 116. The connector 126 extends through the first passageway 114 and the second passageway 118 in the configuration shown. The invention contemplates designs wherein the connector 126 extends through only one of the first passageway 114 or the second passageway 118 also.

While the best modes for carrying out the invention have been described in detail, those familiar with the art to which this invention relates will recognize various alternative designs and embodiments for practicing the scope of the invention within the scope of the appended claims.

What is claimed is:

1. A vehicle comprising:
   a frame;
   at least three wheels operable with respect to the frame;
   a steering system mounted with respect to the frame, operatively connected to at least one wheel and responsive to non-mechanical control signals;
   a braking system mounted with respect to the frame, operatively connected to at least one wheel and responsive to non-mechanical control signals;
   an energy conversion system mounted with respect to the frame, operatively connected to at least one wheel and responsive to non-mechanical control signals;
   a seat rotatable to a plurality of different rotational positions with respect to the frame; and
   an operator interface operably connectable to at least one of the steering system, braking system and energy conversion system for driving the vehicle, and movable with respect to the frame in a manner that does not interfere with the rotation of the seat;
   said operator interface being operable for operating said at least one of the steering, braking and energy conversion systems by hand and without foot action when the seat is in any of said plurality of different rotational positions with respect to the frame.

2. The vehicle of claim 1 wherein the seat is rotatable between a first position facing in one longitudinal direction of the vehicle and a second position facing in the opposite longitudinal direction.

3. The vehicle of claim 1 wherein the operator interface is mounted in a fixed position with respect to the seat and rotatable therewith.

4. A vehicle comprising:
   a frame;
   at least three wheels operable with respect to the frame;
   a steering system mounted with respect to the frame, operatively connected to at least one wheel and responsive to non-mechanical control signals;
   a braking system mounted with respect to the frame, operatively connected to at least one wheel and responsive to non-mechanical control signals;
   an energy conversion system mounted with respect to the frame, operatively connected to at least one wheel and responsive to non-mechanical control signals;
   a seat rotatable to a plurality of different rotational positions with respect to the frame;
   an operator interface operably connectable to at least one of the steering system, braking system and energy conversion system for driving the vehicle, and movable with respect to the frame in a manner that does not interfere with the rotation of the seat;
   said operator interface being operable for operating said at least one of the steering, braking and energy conversion systems by hand and without foot action when the seat is in any of said plurality of different rotational positions with respect to the frame; and
   a sensor operatively connected to the seat and capable of sensing a rotational change in position of the seat, and a control unit operably connectable to the sensor and connected to said at least one of the steering, braking and energy conversion systems, wherein a rotational change in seat position is communicated to said at least one of the systems by the control unit.

5. The vehicle of claim 4 wherein said at least one of said systems is calibrated based upon the rotational change in seat position, and wherein the control unit is programmable to adjust the non-mechanical control signals sent to said at least one of the systems based upon a redistribution of vehicle load position data related to the rotational change in seat position.

6. A drivable vehicle comprising:
   a frame;
   a drive-by-wire control operable by wire and mounted in the frame;
   a driver's seat connected with respect to the frame in a manner to permit horizontal rotation of the seat with respect to the frame and having an operator interface operably connectable to the drive-by-wire control for driving the vehicle;
   said operator interface being operable to drive the vehicle in different directions when the driver's seat is rotated.

7. The vehicle of claim 6, wherein the driver's seat is rotatable between a first position facing in one direction and a second position facing in another direction.

8. The vehicle of claim 6, wherein the operator interface is mounted in a fixed position with respect to the driver's seat and rotatable therewith.

9. The vehicle of claim 6, wherein the rotatable connection of the driver's seat with respect to the frame includes structure forming a passageway through which the operator interface and drive-by-wire control are operably connectable.

10. A drivable vehicle comprising:
a frame;
a drive-by-wire control operable by wire and mounted in the frame;
a driver's seat connected with respect to the frame in a manner to permit horizontal rotation of the seat with respect to the frame and having an operator interface operably connectable to the drive-by-wire control for driving the vehicle;
said operator interface being operable to drive the vehicle in different directions when the driver's seat is rotated;
a sensor operatively connected to the driver's seat and capable of sensing a rotational change in position of the driver's seat; and
a connector operably connectable to the sensor and connected to the drive-by-wire control, wherein a rotational change in driver's seat position is communicated to the drive-by-wire control.

11. The vehicle of claim 10, wherein at least one control signal sent by the drive-by-wire control for driving the vehicle is calibrated based upon a predetermined set of vehicle load distribution data and the drive-by-wire control is programmable to adjust the at least one control signal sent based upon a redistribution of the vehicle load position data related to the rotational change in driver's seat position.

12. The vehicle of claim 11, wherein the control signal is a braking control signal.

13. The vehicle of claim 11, wherein the control signal is an acceleration control signal.

14. The vehicle of claim 11, wherein the control signal is a steering control signal.

15. A drivable vehicle comprising:
a frame;
a drive-by-wire control mounted in the frame and including a drive-by-wire connector port;
a driver's seat connected with respect to the frame in a wanner to permit rotation of the scat with respect to the frame and having an operator interface operably connectable to the drive-by-wire control for driving the vehicle;
a connector operatively associated with the operator interface and configured for complementary engagement with said drive-by-wire connector port;
said operator interface being operable to drive the vehicle in different directions when the driver's seat is rotated.

16. The vehicle of claim 15, wherein the driver's seat is rotatable between a first position facing in one direction and a second position facing in another direction.

17. The vehicle of claim 15, wherein the operator interface is mounted in a fixed position with respect to the driver's seat and rotating therewith.

18. The vehicle of claim 15, wherein the rotatable connection of the driver's seat with respect to the flame includes structure forming a passageway for the connector configured for engagement with the connector port.

19. A drivable vehicle comprising:
a frame;
a drive-by-wire control mounted in the frame and including a drive-by-wire connector port;
a driver's seat connected with respect to the frame in a manner to permit rotation of the seat with respect to the frame and having an operator interface operably connectable to the drive-by-wire control for driving the vehicle;
a connector operatively associated with the operator interface and configured for complementary engagement with said drive-by-wire connector port;
said operator interface being operable to drive the vehicle in different directions when the driver's seat is rotated;
a sensor operatively connected to the driver's seat and capable of sensing a rotational change in position of the driver's seat; and
a second connector operatively associated with the sensor and configured for complementary engagement with the drive-by-wire connector port, wherein a rotational change in driver's seat position is communicated to the drive-by-wire control.

20. The vehicle of claim 19, wherein at least one control signal sent by the drive-by-wire control for driving the vehicle is calibrated based upon a predetermined set of vehicle load distribution data and the drive-by-wire control is programmable to adjust the at least one control signal sent based upon a redistribution of the vehicle load distribution data related to the rotational change in driver's seat position.

21. The vehicle of claim 20, wherein the control signal is a braking control signal.

22. The vehicle of claim 20, wherein the control signal is an acceleration control signal.

23. The vehicle of claim 20, wherein the control signal is a steering control signal.

24. A vehicle comprising:
a frame;
at least three wheels operable with respect to the frame;
a steering system mounted with respect to the frame, operatively connected to at least one wheel and responsive to non-mechanical control signals;
a braking system mounted with respect to the frame, operatively connected to at least one wheel and responsive to non-mechanical control signals;
an energy conversion system mounted with respect to the frame, operatively connected to at least one wheel and responsive to non-mechanical control signals;
a seat connected with respect to the frame in a manner to permit rotation of the seat with respect to the frame between a first position facing in one longitudinal direction and a second position facing in an opposite longitudinal direction; and
an operator interface operably connectable to the steering system, the braking system and the energy conversion system for driving the vehicle, and mounted in a fixed position with respect to the seat and rotatable therewith in a manner that does not interfere with the rotation of the seat;
said operator interface being operable for operating the steering, braking and energy conversion systems when the seat is in either of the first or the second position;
a sensor operatively connected to the seat and capable of sensing a rotational change in position of the seat; and
a control unit operably connectable to the sensor and connected to the steering system, the braking system and the energy conversion system wherein a rotational change in seat position is communicable to the steering system, the braking system and the energy conversion system by the control unit, wherein the steering system, the braking system and the energy conversion system are calibrated based upon the rotational change in seat position and a set of predetermined vehicle load distribution data, and wherein the control unit is programmable to adjust the non-mechanical control signals sent to the steering system, the braking system and the energy conversion system based upon a redistribution of the vehicle load distribution data related to the rotational change in seat position.

25. A control cockpit adapted for use on a vehicle that is controllable through at least one drive-by-wire connector port, the control cockpit comprising:
   a panel mountable on the vehicle and having structure forming a first passageway adapted to communicate with the at least one connector port;
   at least one seat mounted on the panel in a manner to be horizontally movable to a plurality of different positions with respect to the vehicle when the control cockpit is mounted on the vehicle, said at least one seat having structure forming a second passageway in communication with the first passageway in the panel;
   at least one interface movable with the seat and operable for operating the vehicle when the control cockpit is mounted on the vehicle; and
   at least one connector configured for connection with the at least one drive-by-wire connector port at one end and connected at the other end to the interface while extending through the first and second passageways.

26. The control cockpit of claim 25 wherein the at least one driver interface is mounted in a fixed position with respect to the at least one seat and movable therewith.

27. A control cockpit adapted for use on a vehicle that is controllable through at least one drive-by-wire connector port, the control cockpit comprising:
   a panel mountable on the vehicle and having structure forming a first passageway adapted to communicate with the at least one connector port;
   at least one seat mounted on the panel in a manner to be horizontally movable to a plurality of different positions with respect to the vehicle when the control cockpit is mounted on the vehicle, said at least one seat having structure forming a second passageway in communication with the first passageway in the panel;
   at least one interface movable with the seat and operable for operating the vehicle when the control cockpit is mounted on the vehicle;
   at least one connector configured for connection with the at least one drive-by-wire connector port at one end and connected at the other end to the interface while extending through the first and second passageways;
   at least one sensor operatively connected with respect to the at least one seat and capable of sensing a change in position with respect to the vehicle of the at least one seat; and
   at least another connector operatively connected to the at least one sensor at one end and configured for connection with the at least one connector port at the other end while extending through at least one of the first and second passageways whereby to adjust the control of the vehicle in response to the position of the at least one seat.

28. A drivable vehicle comprising:
   a frame;
   at least three wheels operable with respect to the frame in a manner to permit movement of the at least three wheels in a multitude of directions;
   a steering system mounted with respect to the frame, operatively connected to at least one wheel and;
   a braking system mounted with respect to the frame, operatively connected to at least one wheel;
   an energy conversion system mounted with respect to the frame, operatively connected to at least one wheel;
   wherein at least one of said steering system, braking system and energy conversion system is responsive to non-mechanical controls;
   at least one driver's seat connected with respect to the frame in a manner to permit rotation and horizontal translation of the seat with respect to the frame;
   at least one operator interface operably connectable to the at least one of said steering system, braking system and energy conversion system;
   said at least one operator interface being operable through driver input to the at least one operator interface to drive the vehicle in a multitude of different directions.

29. The vehicle of claim 28 wherein the at least one operator interface is operable through direct and not remote driver input.

30. A drivable vehicle comprising:
   a frame;
   at least three wheels operable with respect to the frame in a manner to permit movement of the at least three wheels in a multitude of directions;
   a steering system mounted with respect to the frame, operatively connected to at least one wheel and;
   a braking system mounted with respect to the frame, operatively connected to at least one wheel;
   an energy conversion system mounted with respect to the frame, operatively connected to at least one wheel;
   wherein at least one of said steering system, braking system and energy conversion system is responsive to non-mechanical controls;
   at least one driver's seat connected with respect to the frame in a manner to permit rotation and horizontal translation of the seat with respect to the frame;
   at least one operator interface operably connectable to the at least one of said steering system, braking system and energy conversion system;
   said at least one operator interface being operable through driver input to the at least one operator interface to drive the vehicle in a multitude of different directions;
   at least one sensor operatively connected to the at least one seat and capable of sensing a change in position of the at least one seat; and
   a control unit operably connectable to the at least one sensor and connected to the at least one of said steering system, braking system and energy conversion system, wherein the at least one of said steering system, braking system and energy conversion system is calibrated based upon the change in position of the seat.

31. The vehicle of claim 30 wherein the at least one of said steering system, braking system and energy conversion system is calibrated based upon a set of predetermined vehicle load distribution data, and wherein the control unit is programmable to adjust the non-mechanical control signals sent to the at least one of the steering system, the braking system and the energy conversion system based upon a redistribution of the vehicle load distribution data related to the change in seat position.

32. The vehicle of claim 28 wherein the at least one driver's seat is rotatably connected with respect to the frame.

33. The vehicle of claim 32 wherein the at least one operator interface is operable through direct and not remote driver input.

34. A drivable vehicle comprising:
   a frame;

at least three wheels operable with respect to the frame in a manner to permit movement of the at least three wheels in a multitude of directions;

a steering system mounted with respect to the frame, operatively connected to at least one wheel and;

a braking system mounted with respect to the frame, operatively connected to at least one wheel;

an energy conversion system mounted with respect to the frame, operatively connected to at least one wheel;

wherein at least one of said steering system, braking system and energy conversion system is responsive to non-mechanical controls;

at least one driver—s seat connected with respect to the frame in a manner to permit rotation and horizontal translation of the seat with respect to the frame;

at least one operator interface operably connectable to the at least one of said steering system, braking system and energy conversion system;

said at least one operator interface being operable through driver input to the at least one operator interface to drive the vehicle in a multitude of different directions;

wherein the at least one driver's seat is rotatably connected with respect to the frame;

at least one sensor operatively connected to the at least one seat and capable of sensing a change in position of the at least one seat; and a control unit operably connectable to the at least one sensor and connected to the at least one of said steering system, braking system and energy conversion system, wherein the at least one steering system, braking system and energy conversion system is calibrated based upon the rotational change in seat position.

35. A drivable vehicle comprising:

a frame;

at least three wheels operable with respect to the frame in a manner to permit movement of the at least three wheels in a multitude of directions;

a steering system mounted with respect to the frame, operatively connected to at least one wheel and;

a braking system mounted with respect to the frame, operatively connected to at least one wheel;

an energy conversion system mounted with respect to the frame, operatively connected to at least one wheel;

wherein at least one of said steering system, braking system and energy conversion system is responsive to non-mechanical controls;

at least one driver's seat connected with respect to the frame in a manner to permit rotation and horizontal translation of the seat with respect to the frame;

at least one operator interface operably connectable to the at least one of said steering system, braking system and energy conversion system;

said at least one operator interface being operable through driver input to the at least one operator interface to drive the vehicle in a multitude of different directions;

wherein the at least one driver's seat is rotatably connected with respect to the frame;

wherein the at least one operator interface is operable through direct and not remote driver input; and wherein the at least one of said steering system, braking system and energy conversion system is calibrated in response to a set of predetermined vehicle load position data, and wherein the control unit is programmable to adjust the non-mechanical control signals sent to the at least one of the steering system, the braking system and the energy conversion system in relation to a redistribution of the vehicle load position data related to the change in seat position.

* * * * *